US012612763B2

(12) United States Patent
Yamagoe et al.

(10) Patent No.: US 12,612,763 B2
(45) Date of Patent: Apr. 28, 2026

(54) SYSTEM FOR SETTING OPERATION RANGE OF EXCAVATION MACHINE AND METHOD FOR CONTROLLING SAME

(71) Applicant: KOMATSU LTD., Tokyo (JP)

(72) Inventors: Yosuke Yamagoe, Tokyo (JP); Ryohei Kikuzawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 282 days.

(21) Appl. No.: 18/578,451

(22) PCT Filed: Jun. 22, 2022

(86) PCT No.: PCT/JP2022/024871
§ 371 (c)(1),
(2) Date: Jan. 11, 2024

(87) PCT Pub. No.: WO2023/002796
PCT Pub. Date: Jan. 26, 2023

(65) Prior Publication Data
US 2024/0344295 A1     Oct. 17, 2024

(30) Foreign Application Priority Data

Jul. 19, 2021     (JP) ................................. 2021-118920

(51) Int. Cl.
| | |
|---|---|
| *E02F 9/20* | (2006.01) |
| *E02F 9/26* | (2006.01) |
| *G06F 3/04847* | (2022.01) |
| *E02F 3/32* | (2006.01) |
| *E02F 9/22* | (2006.01) |

(52) U.S. Cl.
CPC ............ *E02F 9/2033* (2013.01); *E02F 9/261* (2013.01); *G06F 3/04847* (2013.01); *E02F 3/32* (2013.01); *E02F 9/2228* (2013.01)

(58) Field of Classification Search
None
See application file for complete search history.

(56) References Cited

U.S. PATENT DOCUMENTS

| | | | | |
|---|---|---|---|---|
| 2014/0111648 A1* | 4/2014 | Ishimoto | ................... | B60R 1/28 |
| | | | | 348/148 |
| 2016/0200252 A1 | 7/2016 | Oota et al. | | |
| 2019/0003155 A1* | 1/2019 | Kurogi | ..................... | B60R 1/28 |

(Continued)

FOREIGN PATENT DOCUMENTS

| | | |
|---|---|---|
| CN | 105474635 A | 4/2016 |
| CN | 113047368 A | 6/2021 |

(Continued)

*Primary Examiner* — Tuan S Nguyen
(74) *Attorney, Agent, or Firm* — Faegre Drinker Biddle & Reath LLP

(57) ABSTRACT

A system for setting an operation range of an excavation machine includes a surroundings information acquisition unit that acquires information on an actual image of the surroundings of the excavation machine, a user interface unit, and a controller that generates a surroundings image based on the information on the actual image acquired by the surroundings information acquisition unit and that displays, on the user interface unit, the surroundings image and a setting guidance image for setting a virtual wall that regulates the operation range of the excavation machine.

9 Claims, 13 Drawing Sheets

(56)             References Cited

U.S. PATENT DOCUMENTS

| | | | |
|---|---|---|---|
| 2020/0291614 A1* | 9/2020 | Kiyota | B60R 1/23 |
| 2021/0010236 A1 | 1/2021 | Nishi | |
| 2021/0071390 A1 | 3/2021 | Kean | |
| 2022/0075584 A1 | 3/2022 | Kumakura et al. | |
| 2022/0205225 A1 | 6/2022 | Shiratani et al. | |
| 2022/0333357 A1 | 10/2022 | Eguchi et al. | |

FOREIGN PATENT DOCUMENTS

| | | |
|---|---|---|
| JP | H06-146332 A | 5/1994 |
| JP | 2011-052383 A | 3/2011 |
| JP | 2013-034142 A | 2/2013 |
| JP | 2019-157409 A | 9/2019 |
| JP | 2020-117982 A | 8/2020 |
| JP | 2021-068948 A | 4/2021 |
| JP | 2021-101103 A | 7/2021 |
| KR | 10-2020-0132891 A | 11/2020 |
| WO | WO-2012/164712 A1 | 12/2012 |
| WO | WO-2019/189030 A1 | 10/2019 |
| WO | WO-2021/060534 A1 | 4/2021 |

* cited by examiner (A)

SYSTEM FOR SETTING OPERATION RANGE OF EXCAVATION MACHINE AND METHOD FOR CONTROLLING SAME

TECHNICAL FIELD

The present disclosure relates to setting of an operation range of an excavation machine.

BACKGROUND ART

Excavation machines, such as hydraulic excavators and electric excavators, are required to prevent such accidents that operation of a work implement or revolving operation of a revolving unit interfere with surrounding obstacles.

Various methods have conventionally been proposed to limit the operation of a work implement by setting pre-scribed heights of the excavation machine as an operation range, and to limit the operation of the work implement by setting the prescribed range as an operation range in order to prevent interference with the operator's cab of a body (see Patent Literatures 1 to 3).

CITATION LIST

Patent Literature

PTL 1: Japanese Patent Laying-Open No. 2011-52383
PTL 2: Japanese Patent Laying-Open No. 2019-157409
PTL 3: WO 2021/060534

SUMMARY OF INVENTION

Technical Problem

In the case of setting the operation range of an excavation machine, there is a risk of setting an inappropriate operation range of the excavation machine unless a correct distance is taken between the excavation machine and objects around the excavation machine.

When the operation range is set based on an excessively long distance between the excavation machine and the objects, work efficiency of the excavation machine may deteriorate.

An object of the present disclosure is to provide a system for setting an operation range of an excavation machine, which can set the operation range of the excavation machine by an easy method, and a method for controlling the system.

Solution to Problem

A system for setting an operation range of an excavation machine according to one aspect of the present disclosure includes a surroundings information acquisition unit that acquires information on an actual image of surroundings of the excavation machine, a user interface unit, and a control-ler that generates a surroundings image based on the infor-mation on the actual image acquired by the surroundings information acquisition unit and that displays, on the user interface unit, the surroundings image and a setting guidance image for setting a virtual wall that regulates the operation range of the excavation machine.

A method for controlling a system for setting an operation range of an excavation machine according to one aspect of the present disclosure includes acquiring information on an actual image of surroundings of the excavation machine, generating a surroundings image based on the acquired information on the actual image, and displaying, on a user interface unit, the surroundings image and a setting guidance image for setting a virtual wall that regulates the operation range of the excavation machine.

Advantageous Effects of Invention

The system for setting the operation range of an excava-tion machine and the method for controlling the system in the present disclosure can set the operation range of the excavation machine by an easy method.

BRIEF DESCRIPTION OF DRAWINGS

FIG. 12 is a diagram describing a system for setting an operation range of an excavation machine based on a modification 2 of the embodiment.

DESCRIPTION OF EMBODIMENTS

Hereinafter, an embodiment will be described with refer-ence to the drawings. Identical components are designated by identical reference signs. The names and functions of the identical components are the same. Detailed description about the identical components is not repeatedly provided.
<Overall Constitution of Excavation Machine>

Figure 1:
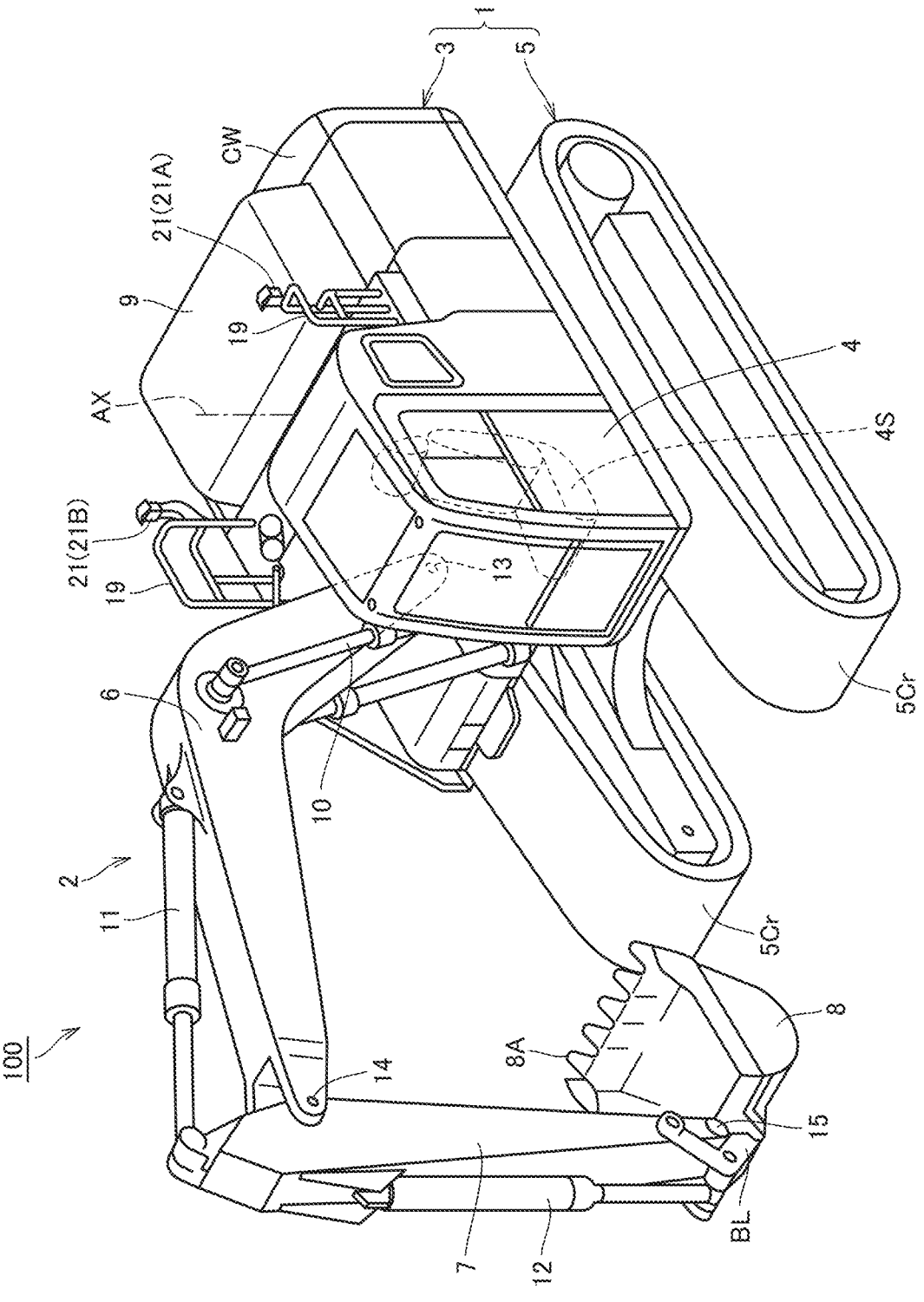
FIG. 1 is an external view of an excavation machine based on an embodiment.

FIG. 1 is an external view of an excavation machine based on an embodiment. As shown in FIG. 1, a hydraulic exca-vator including a work implement 2 that operates with hydraulic pressure is described as an excavation machine to which the concept of the present disclosure is applicable.

Excavation machine 100 includes a body 1 and work implement 2.

Body 1 includes a revolving unit 3, an operator's cab 4, and a traveling apparatus 5.

Revolving unit 3 is arranged on top of traveling apparatus 5. Traveling apparatus 5 supports revolving unit 3. Revolving unit 3 can revolve around a revolution axis AX. Operator's cab 4 includes an operator's seat 4S on which an operator sits. The operator operates excavation machine 100 in operator's cab 4. Traveling apparatus 5 includes a pair of crawler belts 5Cr. As crawler belts 5Cr rotate, excavation machine 100 travels. Traveling apparatus 5 may be constituted of wheels (tires).

Positional relation between respective units will be described with the operator sitting on operator's seat 4S as a reference. A fore/aft direction refers to the fore/aft direction of the operator sitting on operator's seat 4S. A left/right direction refers to the left/right direction of the operator sitting on operator's seat 4S. A left/right direction coincides with the width direction of a vehicle (a vehicle width direction). The direction facing the front side of the operator who sits on operator's seat 4S is defined as a front direction, and the direction opposite to the front direction is defined as a rear direction. The right side and the left side of the operator when the operator sitting on operator's seat 4S faces the front side are defined as a right direction and a left direction, respectively.

Revolving unit 3 includes an engine compartment 9 that houses an engine, and a counterweight CW provided at the rear of revolving unit 3. In revolving unit 3, a handrail 19 is provided in front of engine compartment 9. In engine compartment 9, the engine, a hydraulic pump, and the like, are arranged.

Revolving unit 3 supports work implement 2. Work implement 2 includes a boom 6, a dipper stick 7, a bucket 8, a boom cylinder 10, a dipper stick cylinder 11, and a bucket cylinder 12.

Boom 6 is connected to revolving unit 3 via a boom pin 13. Dipper stick 7 is connected to boom 6 via a dipper stick pin 14. Bucket 8 is connected to dipper stick 7 via a bucket pin 15. Boom cylinder 10 drives boom 6. Dipper stick cylinder 11 drives dipper stick 7. Bucket cylinder 12 drives bucket 8. Boom 6 has a proximal end (a boom foot) connected to revolving unit 3. Boom 6 has a distal end (a boom top) connected to the proximal end of dipper stick 7 (a dipper stick foot). Dipper stick 7 has a distal end (a dipper stick top) connected to the proximal end of bucket 8. Bucket 8 is connected to bucket cylinder 12 via a bucket link BL. Boom cylinder 10, dipper stick cylinder 11, and bucket cylinder 12 are all hydraulic cylinders driven with hydraulic oil. In the embodiment of the present disclosure, bucket 8 is shown as an attachment, though the attachment may be a bucket of other forms, such as a breaker, a skeleton bucket, or a bucket for slope working.

Boom 6 is rotatable relative to revolving unit 3 around boom pin 13 that is a central axis. Dipper stick 7 is rotatable to boom 6 around dipper stick pin 14 that is a central axis parallel to boom pin 13. Bucket 8 is rotatable to dipper stick 7 around bucket pin 15 that is a central axis parallel to boom pin 13 and dipper stick pin 14.

Figure 2:
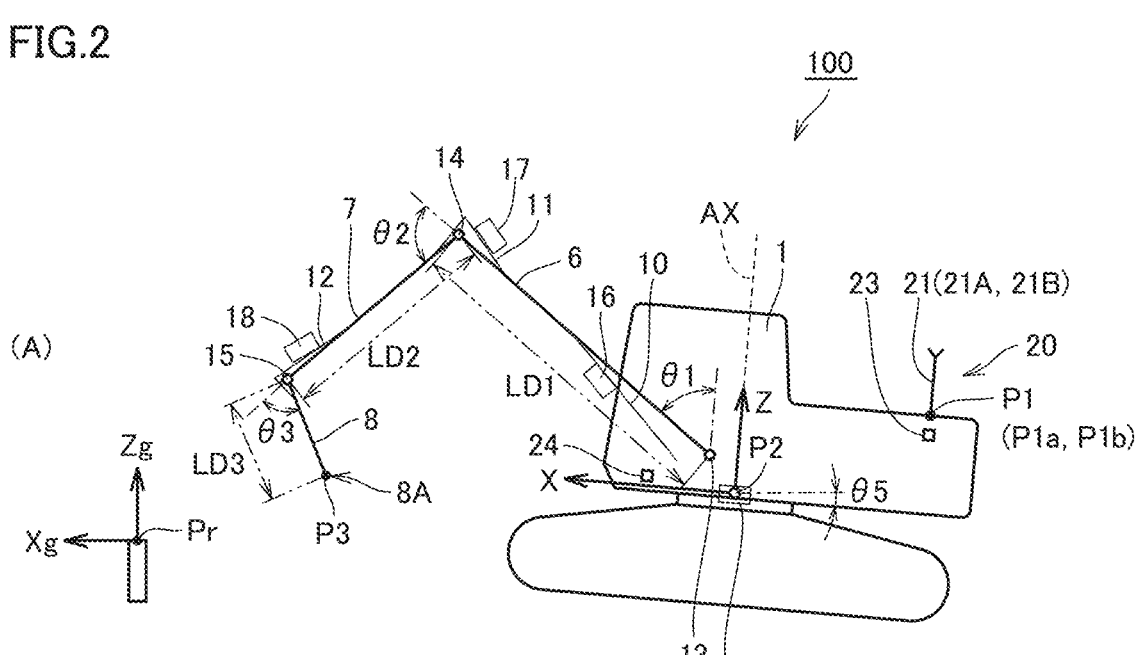
FIG. 2 is a diagram schematically describing an excava-tion machine 100 based on the embodiment.
Figure 2:
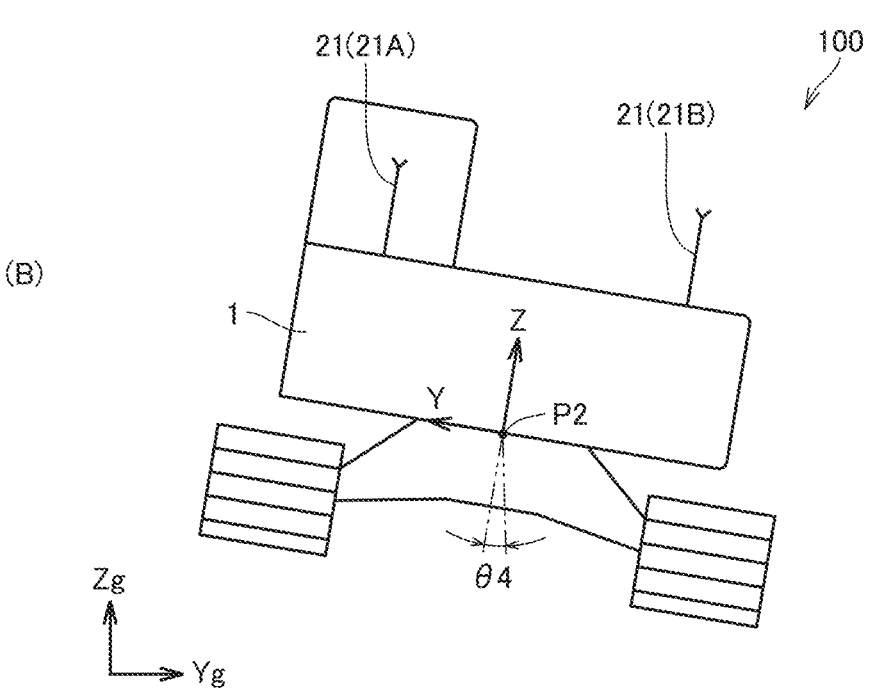

FIG. 2 is a diagram schematically describing excavation machine 100 based on the embodiment. FIG. 2(A) shows a side view of excavation machine 100. FIG. 2(B) shows a rear view of excavation machine 100.

As shown in FIGS. 2(A) and 2(B), boom 6 has a length LD1 that is the distance between boom pin 13 and dipper stick pin 14. Dipper stick 7 has a length LD2 that is the distance between dipper stick pin 14 and bucket pin 15. Bucket 8 has a length LD3 that is the distance between bucket pin 15 and teeth 8A of bucket 8. Bucket 8 has a plurality of teeth, and the distal end of bucket 8 is referred to as teeth 8A. Bucket 8 may not have the teeth. The distal end of bucket 8 may be formed of a straight-shaped steel plate.

Excavation machine 100 includes a boom cylinder stroke sensor 16, a dipper stick cylinder stroke sensor 17, and a bucket cylinder stroke sensor 18. Boom cylinder stroke sensor 16 is arranged on boom cylinder 10. Dipper stick cylinder stroke sensor 17 is arranged on dipper stick cylinder 11. Bucket cylinder stroke sensor 18 is arranged on bucket cylinder 12. Boom cylinder stroke sensor 16, dipper stick cylinder stroke sensor 17, and bucket cylinder stroke sensor 18 are also collectively referred to as cylinder stroke sensors.

Based on the detection result of boom cylinder stroke sensor 16, a stroke length of boom cylinder 10 is obtained. Based on the detection result of dipper stick cylinder stroke sensor 17, a stroke length of dipper stick cylinder 11 is obtained. Based on the detection result of bucket cylinder stroke sensor 18, a stroke length of bucket cylinder 12 is obtained.

The stroke lengths of boom cylinder 10, dipper stick cylinder 11, and bucket cylinder 12 are also referred to as a boom cylinder length, a dipper stick cylinder length, and a bucket cylinder length, respectively. The boom cylinder length, the dipper stick cylinder length, and the bucket cylinder length are also collectively referred to as cylinder length data L. Without being limited to the cylinder stroke sensors, rotation sensors or angle sensors may be provided in joint portions of work implement 2, such as boom pin 13, dipper stick pin 14, and bucket pin 15. The stroke lengths may be detected from obtained detection results. The stroke lengths are included in attitude information.

Excavation machine 100 includes a positioning apparatus 20 that can detect position of excavation machine 100.

Positioning apparatus 20 includes an antenna 21 and a global coordinate computing unit 23.

Antenna 21 is, for example, an antenna for a global navigation satellite systems (GNSS). Antenna 21 is an antenna for a real time kinematic-global navigation satellite systems (RTK-GNSS), for example.

Antenna 21 is provided in revolving unit 3. Antenna 21 is provided in handrail 19 of revolving unit 3. Antenna 21 may be provided in the rear direction of engine compartment 9. Antenna 21 may be provided on the counterweight of revolving unit 3. Antenna 21 outputs signals corresponding to received radio waves (GNSS waves) to global coordinate computing unit 23.

Global coordinate computing unit 23 detects an installation position P1 of antenna 21 in a global coordinate system. The global coordinate system is a three-dimensional coordinate system (Xg, Yg, Zg) based on a reference position Pr arranged in an operation area. Reference position Pr is the position of the tip of a reference pile set in the operation area. A local coordinate system is a three-dimensional coordinate system expressed by (X, Y, Z) with excavation machine 100 as a reference. A reference position of the local coordinate system is data indicating a reference position P2 that is located at a revolution axis (revolution center) AX of revolving unit 3. Antenna 21 includes a first antenna 21A and a second antenna 21B provided in revolving unit 3 so as to be distanced from each other in the vehicle width direction. Global coordinate computing unit 23 detects an installation position P1a of first antenna 21A and an installation position P1b of second antenna 21B. Global coordinate computing unit 23 acquires reference position data P expressed in the global coordinate. Reference position data P is the data indicating reference position P2 that is located at revolution axis (revolution center) AX of revolving unit 3.

Reference position data P may be the data that indicates installation position P1. Global coordinate computing unit 23 generates revolving unit azimuth data Q based on two installation positions P1$a$ and P1$b$. Revolving unit azimuth data Q is determined based on an angle formed between a line defined by installation position P1$a$ and installation position P1$b$ and a reference azimuth (e.g. north) in the global coordinate. Revolving unit azimuth data Q indicates the azimuth in which revolving unit 3 (work implement 2) is directed. Global coordinate computing unit 23 outputs reference position data P and revolving unit azimuth data Q to controller 26 described later. Reference position data P and revolving unit azimuth data Q are included in the attitude information.

Excavation machine 100 includes a body attitude detection sensor 32 that can detect the attitude of body 1 of excavation machine 100. Body attitude detection sensor 32 includes an inertial measurement unit (IMU) 24. IMU 24 is provided in revolving unit 3. IMU 24 is arranged on the lower side of operator's cab 4. In revolving unit 3, a high rigidity frame is arranged on the lower side of operator's cab 4. IMU 24 is arranged on the frame. IMU 24 may be arranged on a lateral side (the right side or the left side) of revolution axis AX (reference position P2) of revolving unit 3. IMU 24 detects an inclination angle θ4 of body 1 inclined in the left/right direction and an inclination angle θ5 of body 1 inclined in the fore/aft direction.

Excavation machine 100 includes a revolution angle sensor 34.

Excavation machine 100 calculates an inclination angle θ1 of boom 6 with respect to revolution axis AX of revolving unit 3, from the boom cylinder length acquired based on the detection result of boom cylinder stroke sensor 16. Excavation machine 100 calculates an inclination angle θ2 of dipper stick 7 with respect to boom 6, from the dipper stick cylinder length acquired based on the detection result of dipper stick cylinder stroke sensor 17. Excavation machine 100 calculates an inclination angle θ3 of teeth 8A of bucket 8 with respect to dipper stick 7, from the bucket cylinder length acquired based on the detection result of bucket cylinder stroke sensor 18. Based on the calculation results, including inclination angles θ1, θ2, and θ3 representing the attitude of work implement 2, inclination angle θ4 representing the attitude of body 1 inclined in the left/right direction, inclination angle θ5 representing the attitude of body 1 inclined in the fore/aft direction, reference position data P, and revolving unit azimuth data Q, it becomes possible to specify the positions of boom 6, dipper stick 7, and bucket 8 of excavation machine 100. It is possible to specify the distal end position of the bucket for setting a virtual wall that regulates the operation range of excavation machine 100 and to acquire the coordinates of the distal end position.

Inclination angle θ1 of boom 6, inclination angle θ2 of dipper stick 7, and inclination angle θ3 of bucket 8 may be detected without use of the cylinder stroke sensors. Inclination angle θ1 of boom 6 may be detected by a revolution sensor such as rotary encoders, or by an angle detector such as angle sensors. The angle detector detects a bending angle of boom 6 with respect to revolving unit 3 to detect inclination angle θ1. Inclination angle θ2 of dipper stick 7 may be detected by an angle detector mounted on dipper stick 7. Inclination angle θ3 of bucket 8 may be detected by an angle detector mounted on bucket 8. The attitude information may be detected via IMU 24 mounted on the work implement. The inclination angles (θ1, θ2, θ3, θ4, and θ5) are each included in the attitude information.

Figure 3:
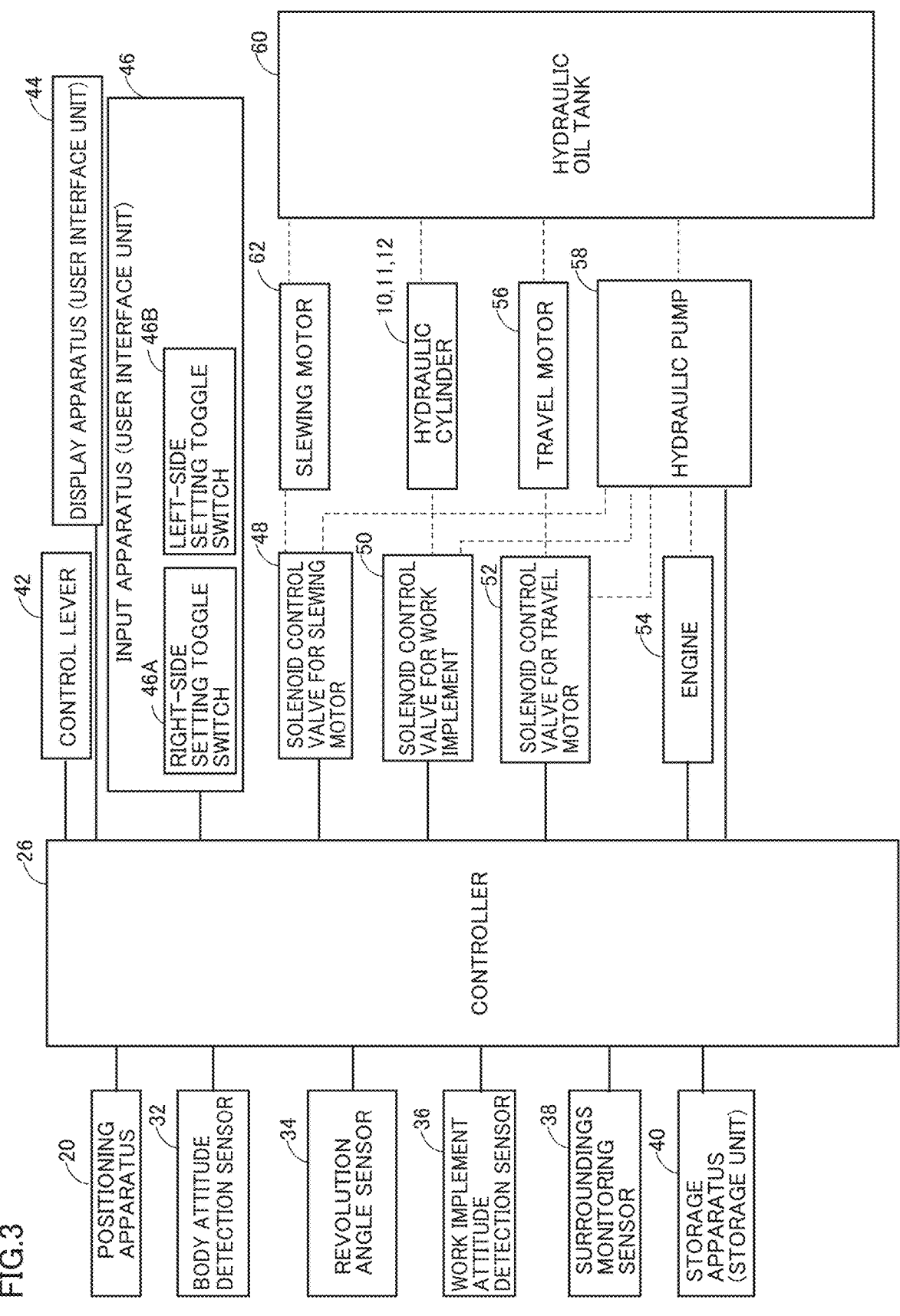
FIG. 3 is a schematic block diagram showing the con-figuration of a control system of excavation machine 100 based on the embodiment.

FIG. 3 is a schematic block diagram showing the configuration of a control system of excavation machine 100 based on the embodiment. As shown in FIG. 3, excavation machine 100 includes positioning apparatus 20, body attitude detection sensor 32, revolution angle sensor 34, a work implement attitude detection sensor 36, a surroundings monitoring sensor 38, a storage apparatus 40 that is one of storage units, a control lever 42, display apparatus 44 that is one of user interface units, an input apparatus 46 that is one of user interface units, a solenoid control valve 48 for slewing motor, a slewing motor 62, a solenoid control valve 50 for work implement, hydraulic cylinders 10, 11, and 12, a solenoid control valve 52 for travel motor, a travel motor 56, an engine 54, a hydraulic pump 58, a hydraulic oil tank 60, and controller 26.

In FIG. 3, dotted lines indicate connections by mechanical coupling or hydraulic piping. Solid lines indicate connections by signal lines.

Controller 26 is a central processing unit (CPU) that is an apparatus for controlling entire excavation machine 100.

Positioning apparatus 20 includes antenna 21 and global coordinate computing unit 23, and outputs reference position data P and revolving unit azimuth data Q.

Body attitude detection sensor 32 includes IMU 42 and detects inclination angle θ4 of body 1 inclined in the left/right direction and inclination angle θ5 of body 1 inclined in the fore/aft direction.

Revolution angle sensor 34 detects an angle of revolving unit 3 with respect to revolution center AX of excavation machine 100.

Work implement attitude detection sensor 36 includes boom cylinder stroke sensor 16, dipper stick cylinder stroke sensor 17 and bucket cylinder stroke sensor 18 to detect the boom cylinder length, the dipper stick cylinder length, and the bucket cylinder length.

Surroundings monitoring sensor 38 includes at least one of a camera, an ultrasonic sensor, a radar, and a light detection and ranging (LIDAR) to measure information on surroundings of excavation machine 100. Surroundings monitoring sensor 38 includes a plurality of cameras provided so as to image the surroundings of excavation machine 100, and acquires information on an actual image obtained by imaging the surroundings of excavation machine 100. Surroundings monitoring sensor 38 can also use a stereo camera so as to measure the position information on a point cloud in the imaged real image as information on the real image. The position information on the point cloud in the real image may be measured by a combination of a monocular camera and any one of an ultrasonic sensor, a radar, or a LIDAR, instead of the stereo camera.

Storage apparatus 40 stores various programs and data. Storage apparatus 40 is any storage apparatus (storage medium) that allows controller 26 to access. Storage apparatus 40 may be, for example, a storage unit built into controller 26, such as hard disks or memories, or may be, for example, a removable storage medium, such as optical discs and cartridges, or may be both the storage unit and the storage medium.

Control lever 42 receives operation instructions of an operator to excavation machine 100. Control lever 42 includes a work implement lever to operate work implement 2, a revolving lever to revolve revolving unit 3, and a travel lever to operate traveling apparatus 5. Control lever 42 is provided in the vicinity of operator's seat 4S.

Display apparatus 44, which is one of the user interface units, is a display that provides information to the operator. Display apparatus 44, which is constituted of a liquid crystal display, an organic EL display, or the like, is arranged in the vicinity of operator's seat 4S.

Figure 8:
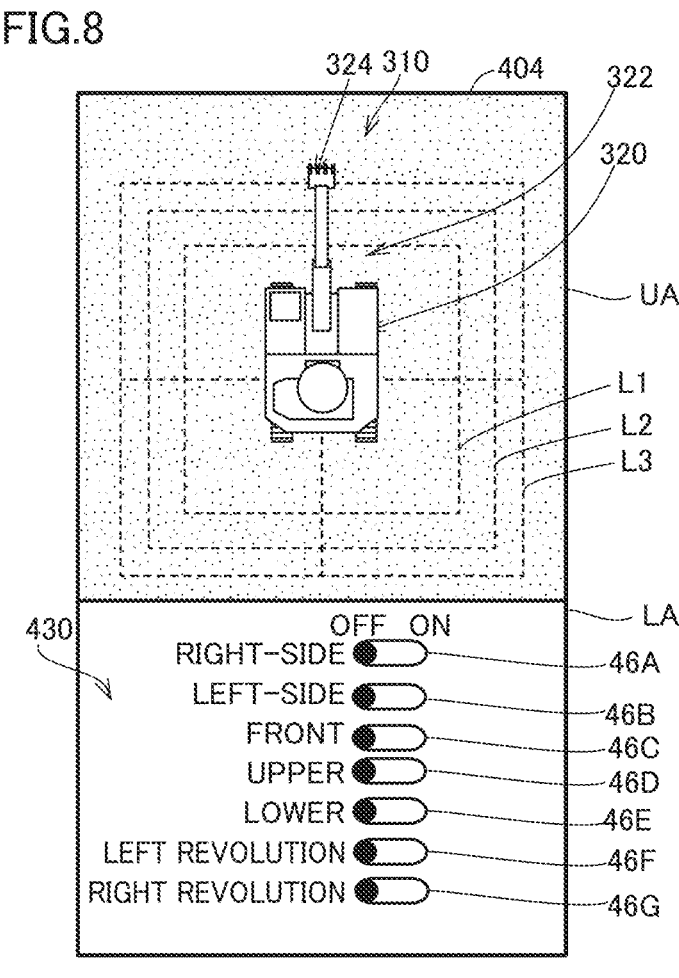
FIG. 8 is a diagram describing an example of a virtual wall setting screen 404 displayed on the display apparatus 44 based on the embodiment.

Input apparatus 46, which is one of the user interface units, includes a touch panel, setting toggle switches, and input buttons provided in display apparatus 44. Input apparatus 46 and display apparatus 44 may be an integrated unit or separate units. When input apparatus 46 and display apparatus 44 are separated units, they are desirably arranged in close proximity. Input apparatus 46 includes a right-side setting toggle switch 46A for setting a virtual wall on one lateral side (right-side) of excavation machine 100, and a left-side setting toggle switch 46B for setting a virtual wall on the other lateral side (left-side) of excavation machine 100. As shown in FIG. 8 described later, input apparatus 46 further includes a front setting toggle switch 46C for setting the virtual wall in front of excavation machine 100, an upper setting toggle switch 46D, a lower setting toggle switch 46E, a left revolution setting toggle switch 46F, and a right revolution setting toggle switch 46G, which are all included in a setting guidance screen 430. Each setting toggle switch functions as a unit that selects and determines whether to set the virtual wall or not.

Figure 6:
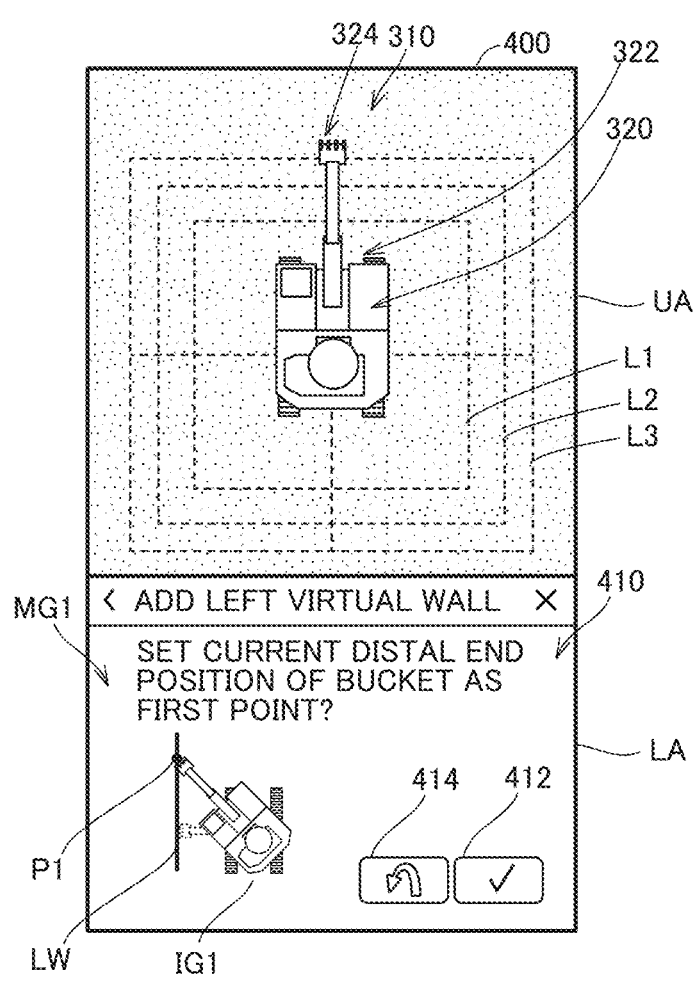
FIG. 6 is a diagram describing an example of a virtual wall setting screen 400 displayed on the display apparatus 44 based on the embodiment.
Figure 7:
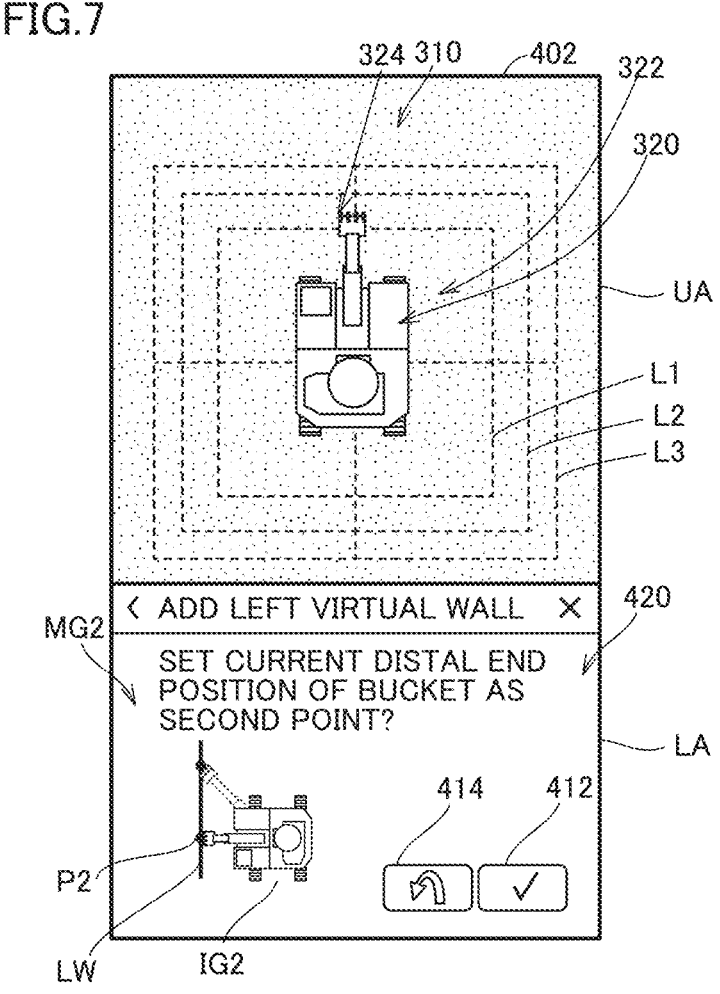
FIG. 7 is a diagram describing an example of a virtual wall setting screen 402 displayed on the display apparatus 44 based on the embodiment.

FIG. 8 shows the state where all of the setting toggle switches are off. For example, when front setting toggle switch 46C is set to on, the position of teeth 8A of bucket 8 (the distal end position of the attachment) at the time is calculated, and a front virtual wall is set at a front position based on the distance between teeth 8A and a prescribed position of revolving unit 3. Here, the prescribed position of revolving unit 3 may be replaced with a prescribed position of traveling apparatus 5. When one of or both of upper setting toggle switch 46D and lower setting toggle switch 46E are set to on, the position of teeth 8A of bucket 8 (the distal end position of the attachment) at the time is calculated, and an upper virtual wall or a lower virtual wall is set at an upper position or a lower position based on the distance between teeth 8A and a prescribed position of revolving unit 3. Here, the prescribed position of revolving unit 3 may be replaced with a prescribed position of traveling apparatus 5. When lower setting toggle switch 46E is turned on, the screen of display apparatus 44 may be changed so as to display a blank screen that allows input of a depth value below the ground and to display setting buttons. In this case, when the operator inputs, for example, a value of 1.5 and presses a setting button 412 as shown in FIGS. 6 and 7, a lower virtual wall is set at a depth position of 1.5 m below the lower surface of traveling apparatus 5. When left-side setting toggle switch 46A and right-side setting toggle switch 46B are turned on, a virtual wall is not set by that operation alone. Detailed description for setting the left-side and right-side virtual walls will be provided later.

When one of or both of left revolution setting toggle switch 46F and right revolution setting toggle switch 46G are turned on, a relative angle between traveling apparatus 5 and revolving unit 3 is determined based on the revolution angle of revolving unit 3 at the time of turning on, and the operation range that allows revolution of excavation machine 100 is regulated. The revolution angle can be obtained by revolution angle sensor 34. For example, when left revolution setting toggle switch 46F is turned on while revolving unit 3 is in the state of being revolved 30 degrees counter-clockwise from the position of facing forward, revolving unit 3 can only revolve up to 30 degrees counter-clockwise from the position of facing forward. For example, when right revolution setting toggle switch 46G is turned on while revolving unit 3 is in the state of being revolved 30 degrees clockwise from the position of facing forward, revolving unit 3 can only revolve up to 30 degrees clockwise from the position of facing forward.

The operator can set a virtual wall (right-side virtual wall) on one lateral side of the excavation machine 100 by turning on the right-side setting toggle switch 46A. The operator can set a virtual wall (left-side virtual wall) on the other lateral side of excavation machine 100 by turning on left-side setting toggle switch 46B. As described above, in the case of setting the right-side virtual wall and the left-side virtual wall, turning on each toggle switch (46A, 46B) does not complete the setting of the virtual wall.

On the contrary, when the operator turns on front setting toggle switch 46C as described above, setting the virtual wall in front of excavation machine 100 can be completed at the time of this turning on.

Solenoid control valve 48 for slewing motor receives a supply of hydraulic oil from hydraulic pump 58 and adjusts a supply amount of hydraulic oil supplied to slewing motor 62 in accordance with instructions of the controller 26.

Slewing motor 62 rotates with the hydraulic oil that is supplied via solenoid control valve 48 for slewing motor and performs revolving operation of revolving unit 3.

Solenoid control valve 50 for work implement is supplied with hydraulic oil from hydraulic pump 58, and adjusts the supply amount of the hydraulic oil that is supplied to hydraulic cylinders including boom cylinder 10, dipper stick cylinder 11, and bucket cylinder 12 in accordance with instructions of controller 26.

Solenoid control valve 52 for travel motor receives a supply of hydraulic oil from hydraulic pump 58 and adjusts the supply amount of hydraulic oil that is supplied to travel motor 56 in accordance with instructions of controller 26.

Travel motor 56 rotates with the hydraulic oil supplied via solenoid control valve 52 for travel motor and performs travel operation of traveling apparatus 5.

Hydraulic pump 58 is driven by the drive power of engine 54 to supply the hydraulic oil to each unit.

Hydraulic oil tank 60 is a tank that stores the hydraulic oil. Hydraulic oil tank 60 collects the hydraulic oil drained from slewing motor 62, boom cylinder 10, dipper stick cylinder 11, bucket cylinder 12, and travel motor 56, and also supplies the hydraulic oil to hydraulic pump 58.

In the embodiment, the configuration including setting toggle switches by software buttons as input apparatus 46 is described. However, it may be possible to allow the virtual wall to be set by using other switches or buttons, including mechanical ones, in addition to the setting toggle switches by software buttons. For example, it may be possible to allow the virtual wall to be set when the operator selects a software button, displayed on the touch panel of display apparatus 44, as the setting toggle switch by the software button.

<Configuration of Controller>

Figure 4:
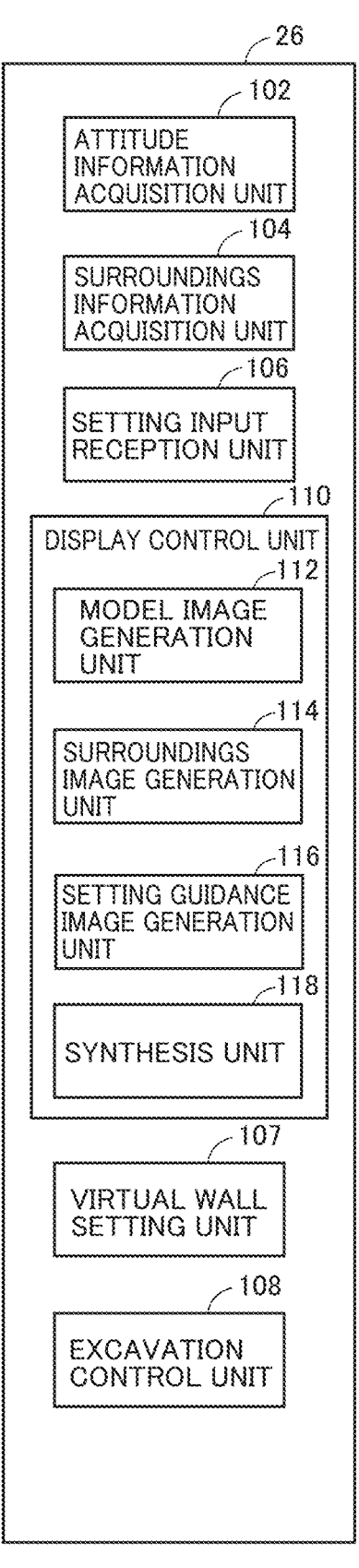
FIG. 4 is a block diagram showing the configuration of a controller 26 based on the embodiment.

FIG. 4 is a block diagram showing the configuration of controller 26 based on the embodiment.

Excavation machine 100 based on the embodiment causes controller 26 to execute the processing of setting the operation range of the excavation machine. Controller 26 sets a virtual wall that regulates the operation range, as the setting of the operation range of the excavation machine. Controller 26 implements various functional blocks by executing programs stored in storage apparatus 40. The programs stored in storage apparatus 40 may be pre-stored programs or programs downloaded through a server, or the like, connected to a network not shown.

As shown in FIG. 4, controller 26 includes an attitude information acquisition unit 102, a surroundings information acquisition unit 104, a setting input reception unit 106, a display control unit 110, virtual wall setting unit 107, and an excavation control unit 108.

Attitude information acquisition unit 102 acquires attitude information on excavation machine 100. Attitude information acquisition unit 102 acquires inclination angles θ1, θ2, and θ3 representing the attitude of work implement 2 as the attitude information on excavation machine 100, inclination angle θ4 representing the attitude of body 1 inclined in the left/right direction, inclination angle θ5 of body 1 inclined in the fore/aft direction, and an angle of revolving unit 3.

Surroundings information acquisition unit 104 acquires information on an actual image of the surroundings of excavation machine 100. Surroundings information acquisition unit 104 acquires information on an actual image obtained by imaging the surroundings of excavation machine 100.

Setting input reception unit 106 receives an input of the setting of a surrounding wall of excavation machine 100 by the operator. Setting input reception unit 106 receives each of the input of turning on right-side setting toggle switch 46A and the input of turning on left-side setting toggle switch 46B by the operator. Setting input reception unit 106 receives the input to the touch panel installed on display apparatus 44 by the operator.

Display control unit 110 executes display control for display apparatus 44.

Virtual wall setting unit 107 executes processing of setting the virtual wall that regulates the operation range of excavation machine 100.

Excavation control unit 108 controls work implement 2 to execute excavation operation to excavate soil or the like that is an excavation object, with bucket 8. When a virtual wall is set, excavation control unit 108 may regulate the operation range of work implement 2 to control so that work implement 2 does not operate beyond the position of the set virtual wall. For example, when work implement 2 is about to operate beyond the position of the set virtual wall, excavation control unit 108 may calculate a relative positional relation between the current position of teeth 8A of work implement 2 and the virtual wall, and regulate and control the operation of work implement 2 by slowing or stopping the operation in accordance with the calculated relative distance. In addition to the control that regulates work implement 2, excavation control unit 108 may also perform control that notifies the operator of a warning by an alarm apparatus, the illustration of which is omitted.

Display control unit 110 includes a model image generation unit 112, a surroundings image generation unit 114, a setting guidance image generation unit 116, and a synthesis unit 118.

Model image generation unit 112 generates an upper surface model image of excavation machine 100. In the embodiment of the present disclosure, a single graphic data set representing an upper surface view of excavation machine 100 that faces the front is stored in storage apparatus 40. Model image generation unit 112 reads the upper surface model image from storage apparatus 40 and generates the upper surface model image of excavation machine 100.

Model image generation unit 112 may sequentially generate images by changing the upper surface model image of excavation machine 100 based on the attitude information on excavation machine 100 acquired by attitude information acquisition unit 102. Alternatively, based on the attitude information on excavation machine 100, model image generation unit 112 may read a plurality of graphic data sets that are pre-stored in the storage apparatus 40, and determines one graphic data set corresponding to the attitude information to generate an upper surface model image 320 of excavation machine 100. In this case, as the plurality of data sets, a plurality of combinations of the attitudes of work implement 2 and the revolution angles of revolving unit 3 may be stored in storage apparatus 40. Model image generation unit 112 may generate a three-dimensional model that is similar in size to excavation machine 100 based on the attitude information on excavation machine 100, and may generate an upper surface model image when the three-dimensional model is viewed from the top.

Surroundings image generation unit 114 generates a surroundings image of excavation machine 100. Surroundings image generation unit 114 generates the surroundings image based on the information on an actual image acquired by surroundings information acquisition unit 104. Surroundings image generation unit 114 can acquire actual image data of a plurality of cameras provided so that the surroundings of excavation machine 100 can be imaged, and executes image edition processing of the plurality of actual image data sets to generate the surroundings image of excavation machine 100 as viewed from the top. The surroundings image is generated as an image as viewed down from above excavation machine 100.

Setting guidance image generation unit 116 generates a setting guidance image for setting the virtual wall. The setting guidance image generation unit 116 generates the setting guidance image for setting a corresponding virtual wall in accordance with the input setting of either right-side setting toggle switch 46A being turned on or left-side setting toggle switch 46B being turned on. For example, when right-side setting toggle switch 46A is turned on, setting guidance image generation unit 116 generates a setting guidance image for setting the right-side virtual wall. When left-side setting toggle switch 46B is turned on, setting guidance image generation unit 116 generates a setting guidance image for setting the left-side virtual wall.

Synthesis unit 118 synthesizes the upper surface model image, the surroundings image, and the setting guidance image, and displays the synthesis image on display apparatus 44. Synthesis unit 118 synthesizes a partial surroundings image, which is cut out from the surroundings of excavation machine 100 captured by surroundings monitoring sensor 38, in place of the surrounding image, and displays the synthesis image on display apparatus 44. Synthesis unit 118 may also synthesize the partial surroundings image in place of the setting guidance image and displays the synthesis image on display apparatus 44. Synthesis unit 118 may synthesize the surroundings image and the setting guidance image without synthesizing the upper surface model image, and display the resultant image on display apparatus 44. Alternatively, synthesis unit 118 may synthesize the partial surroundings image and the setting guidance image without synthesizing the upper surface model image, and display the resultant image on display apparatus 44. In normal mode where no virtual wall is set, the upper surface model image and the surroundings image are synthesized and displayed in an upper area of display apparatus 44, while the partial surroundings image is synthesized and displayed in a lower area of display apparatus 44. In setting mode when the virtual wall is set, the upper surface model image and the surroundings image are synthesized and displayed in the upper area of display apparatus 44, while the setting guidance image is synthesized and displayed in the lower area of display apparatus 44.

Figure 5:
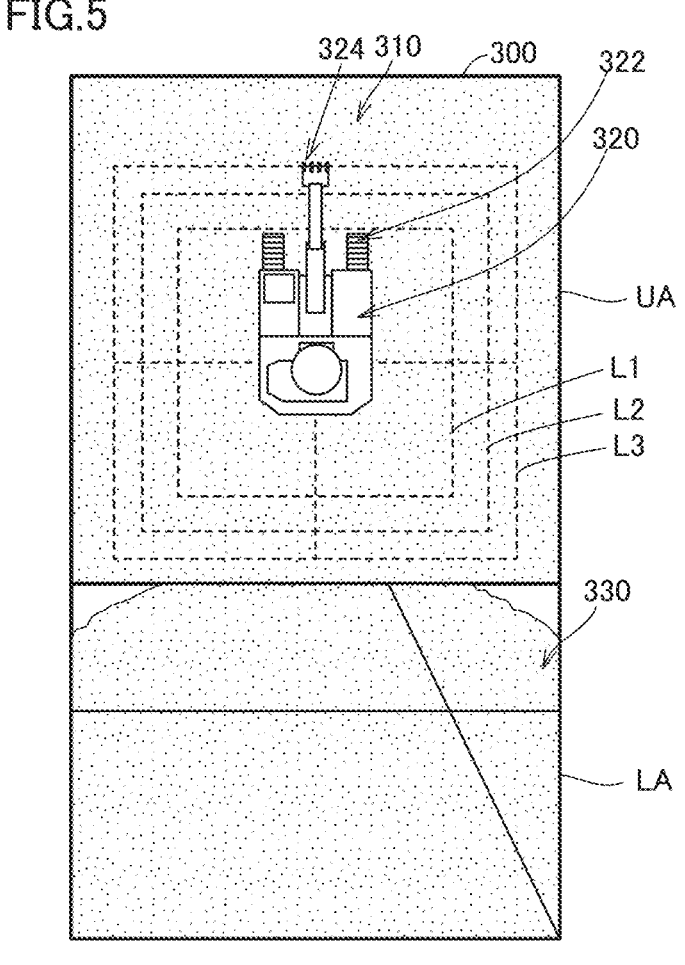
FIG. 5 is an example of a screen displayed on a display apparatus 44 based on the embodiment.

FIG. 5 is an example of a screen displayed on display apparatus 44 based on the embodiment. FIG. 5 shows a screen 300 that is displayed on display apparatus 44 in normal mode. Screen 300 is the screen for normal mode where no virtual wall is set.

Display apparatus 44 displays screen 300 that is divided into an upper area UA and a lower area LA. Display apparatus 44 can display upper area UA and lower area LA at the same time.

Upper area UA of screen 300 displays an image of excavation machine 100 as viewed from the top (upper surface model image 320). Upper surface model image 320 of excavation machine 100 is an image as viewed down from above excavation machine 100. In lower area LA of screen 300, a front image (single image 330) that is imaged by a camera provided on the front side of work implement 2 is displayed as the partial surroundings image. In lower area LA, a front image of excavation machine 100 that is converted to the operator's view point may be displayed as the partial surroundings image. Thus, the partial surroundings image may be an image taken by a camera that is provided in the location that is, for example, the ceiling of operator's cab 4 of revolving unit 3 so as to face the front side of work implement 2, or a front image created by executing the image edition processing of images taken by a plurality of cameras so as to have the operator's view point. The partial surroundings image may be an image taken by a camera that is arranged in a location that enables the image to be taken in a direction different from the front side.

In upper area UA of screen 300, upper surface model image 320 of excavation machine 100, and surroundings image 310 around excavation machine 100 are synthesized and displayed in the synthesized state.

In the embodiment of the present disclosure, upper surface model image 320 is not an image actually taken from above excavation machine 100. As described above, upper surface model image 320 is an image displayed based on a single graphic data set representing the upper surface view of excavation machine 100 that faces the front. Upper surface model image 320 is a model image displayed in a similar size to the actual excavation machine.

Screen 300 displays virtual lines L1 to L3. Virtual lines L1 to L3 are guide lines for grasping the sense of distance from excavation machine 100. Virtual lines L1 to L3 can be hidden. Instead of the guide lines, virtual lines that indicate the actual distance may be provided. Virtual lines L1 to L3 are superimposed on surroundings image 310 and displayed so as to surround upper surface model image 320.

FIG. 6 is a diagram describing an example of a virtual wall setting screen 400 displayed on display apparatus 44 based on the embodiment. FIG. 6 shows virtual wall setting screen 400. When the operator turns on left-side setting toggle switch 46B, the screen is changed to virtual wall setting screen 400.

Display apparatus 44 displays setting screen 400 that is divided into upper area UA and lower area LA. Setting screen 400 displays upper area UA and lower area LA at the same time.

Upper area UA of setting screen 400 displays an image of excavation machine 100 as viewed from the top (upper surface model image 320). The image of excavation machine 100 as viewed from the top is an image as viewed down from above excavation machine 100. In lower area LA of setting screen 400, a setting guidance image 410 for a first point that is for setting the left-side virtual wall is displayed.

In upper area UA of setting screen 400, upper surface model image 320 of excavation machine 100 and surroundings image 310 around excavation machine 100 are synthesized and displayed in the synthesized state.

Upper surface model image 320 includes a crawler belt model image 322 and a work implement model image 324.

In lower area LA, as the setting guidance image 410, an image IG1 for setting the left-side virtual wall and a message MG1 for setting the left-side virtual wall "set current distal end position of bucket as first point?" is displayed. The content of message MG1 may be the content of procedures that provide the operator with a guidance on how to set up a virtual wall, or may be the content of confirmation to prompt the operator to confirm that the virtual wall is set at the current position. Setting screen 400 includes a setting button 412 that can receive an operation input of the operator, and a cancel button 414.

Image IG1 is an image representing positional relation between the attitude of the excavation machine and the virtual wall, in order to promote setting of the virtual wall. Image IG1 representing the attitude of the excavation machine is a graphic image of excavation machine 100 viewed from the top, in which a solid line indicates the revolving unit, the work implement, and the traveling apparatus when the revolving unit revolves counterclockwise by a prescribed angle, and a broken line indicates the work implement when the revolving unit further revolves counterclockwise by a prescribed angle. In this case, there may be no indication of the work implement represented by the broken line. Image IG1 further displays a linear graphic image representing a left-side virtual wall LW at the same time. Image IG1 further displays a point P1 at the area where left-side virtual wall LW is in contact with the distal end of the work implement.

When receiving an operator's selection input of setting button 412 through setting input reception unit 106, the virtual wall setting unit 107 sets the coordinates of a first point corresponding to the distal end of the bucket for setting the left-side virtual wall. When the setting of the first point is received, virtual wall setting screen 400 changes to a next virtual wall setting screen.

The virtual wall setting processing is canceled when the operator selects cancel button 414. The screen of display apparatus 44 changes, and screen 300 for normal mode is displayed on display apparatus 44.

FIG. 7 is a diagram describing an example of virtual wall setting screen 402 displayed on display apparatus 44 based on the embodiment. FIG. 7 shows virtual wall setting screen 402, which is the screen obtained after screen is changed when the operator turns on left-side setting toggle switch 46B.

Display apparatus 44 displays setting screen 402 that is divided into upper area UA and lower area LA. Setting screen 402 can display upper area UA and lower area LA at the same time.

Upper area UA of setting screen 402 displays an image of excavation machine 100 as viewed from the top (upper surface model image 320). The image of excavation machine 100 as viewed from the top is an image as viewed down from above excavation machine 100. In lower area LA of setting screen 402, setting guidance image 420 for a second point for setting the left-side virtual wall is displayed.

In upper area UA of setting screen 402, upper surface model image 320 of excavation machine 100 and surroundings image 310 around excavation machine 100 are synthesized and displayed in the synthesized state.

Upper surface model image 320 includes crawler belt model image 322 and work implement model image 324.

In lower area LA, as the setting guidance image 420, an image IG2 for setting the left-side virtual wall and a message MG2 for setting the left-side virtual wall "set current distal end position of bucket as second point?" are displayed. The content of message MG2 may be the content of procedures that provide the operator with a guidance on how to set up a virtual wall, or may be the content of confirmation to prompt the operator to confirm that the virtual wall is set at the current position. Setting screen 402 includes setting button 412 and cancel button 414.

Image IG2 is an image representing positional relation between the attitude of the excavation machine and the virtual wall in order to promote setting of the virtual wall. Image IG2 is a graphic image of excavation machine 100 viewed from the top, in which a broken line indicates the work implement when the revolving unit revolves by a prescribed angle, and a solid line represents the revolving unit, the work implement, and the traveling apparatus when the revolving unit and the work implement further revolves counterclockwise by a prescribed angle. In this case, there may be no indication of the work implement represented by the broken line. Image IG2 further displays a linear graphic image representing left-side virtual wall LW at the same time. Note that image IG2 is different from image IG1 shown in FIG. 6 in following points. The solid line in image IG2 represents the revolving unit and the work implement in the state further revolved counterclockwise than those indicated by the solid line in image IG1. Image IG2 further displays a point P2 at the area where left-side virtual wall LW is in contact with the distal end of the work implement. While the position of point P2 is on the line indicated by the left-side virtual wall LW as in point P1 shown in FIG. 6, the position of point P2 is different from the position of point P1. Point P2 is displayed at the position below the position of point P1.

When virtual wall setting unit 107 receives an operator's selection input of setting button 412 through setting input reception unit 106, virtual wall setting unit 107 sets the coordinates of the second point corresponding to the distal end of the bucket for setting the left-side virtual wall. The virtual wall setting unit 107 sets the left-side virtual wall based on the coordinates of the first point and the coordinates of the second point for setting the left-side virtual wall.

When the operator selects cancel button 414, the virtual wall setting processing corresponding to the second point is canceled, and the processing returns to the virtual wall setting processing corresponding to the first point. Virtual wall setting screen 402 changes, and the display apparatus 44 returns to virtual wall setting screen 400.

Description has been given of the case where the left-side virtual wall that is one lateral wall of excavation machine 100 is set in the virtual wall setting screen. The same applies to the case where the right-side virtual wall that is the other lateral wall of excavation machine 100 is set.

FIG. 8 is a diagram describing an example of a visual wall setting screen 404 displayed on display apparatus 44 based on the embodiment. FIG. 8 shows virtual wall setting screen 404. In a setting guidance image 430, setting toggle switches are displayed in lower area LA for the operator to perform on/off operation of front setting toggle switch 46C as well as right-side setting toggle switch 46A and left-side setting toggle switch 46B. In addition to front setting toggle switch 46C, upper setting toggle switch 46D and lower setting toggle switch 46E for the operator to set the virtual wall on the upper side and the lower side, as well as left revolution setting toggle switch 46F and right revolution setting toggle switch 46G for the operator to set revolvable operation ranges may further be displayed in lower area LA. In setting guidance image 430 shown in FIG. 8, each setting toggle switch (46C, 46D, 46D, 46E, 46F, and 46G) is independently displayed. Each setting toggle switch displays a circular toggle that can be set by selecting either on position or off position.

In the case of setting left-side virtual wall LW or right-side virtual wall RW in FIGS. 6 and 7, setting guidance image 420, including image IG1, image IG2, message MG1, and message MG2, is displayed in lower area LA. However, in the case of setting the virtual wall on the front side, the upper side, or the lower side, setting guidance image 430 as shown in FIG. 8 is displayed and in this case, those corresponding to image IG1, image IG2, message MG1, and message MG2, are not displayed.

Display apparatus 44 displays setting screen 404 that is divided into upper area UA and lower area LA. Setting screen 404 displays upper area UA and lower area LA at the same time.

Upper area UA of setting screen 404 displays an image of excavation machine 100 as viewed from the top (upper surface model image 320). The image of excavation machine 100 as viewed from the top is an image as viewed down from above excavation machine 100.

In upper area UA of setting screen 404, upper surface model image 320 of excavation machine 100 and surroundings image 310 around excavation machine 100 are synthesized and displayed in the synthesized state. Virtual lines L1 to L3 are superimposed on surroundings image 310 and displayed so as to surround upper surface model image 320.

Upper surface model image 320 includes crawler belt model image 322 and work implement model image 324.

For example, assume the case where operation of turning on the front setting toggle switch 46C is performed while FIG. 8 is displayed on display apparatus 44. In this case, after the screen changes, a message for setting the front virtual wall "set front virtual wall based on current distal end position of bucket?" may be displayed together with a setting image of the front virtual wall as the setting guidance image 430 in lower area LA. Setting screen 404 may include setting button 412 and cancel button 414 that can receive the operation input of the operator. In this way, when the virtual wall is set on the front side, setting guidance image 430 may be displayed, which is a graphic image of excavation machine 100 viewed from the top and includes an image expressing that the direction of the work implement is pointed to the upper side of the screen.

Description has been given of the virtual wall setting screen in the case of setting the front virtual wall on the front side of excavation machine 100. However, it is also possible to set a rear virtual wall at the rear side of excavation machine 100, or to set an upper virtual wall on the upper side or a lower virtual wall on the lower side of excavation machine 100. In the embodiment of the present disclosure, in the case of setting the front virtual wall, the upper virtual wall, the lower virtual wall, or the rear virtual wall, the operator can complete the virtual wall setting by simple operation of turning on each setting toggle switch that is displayed on setting guidance image 430, while work implement 2 is put in a desired attitude.

Figure 9:
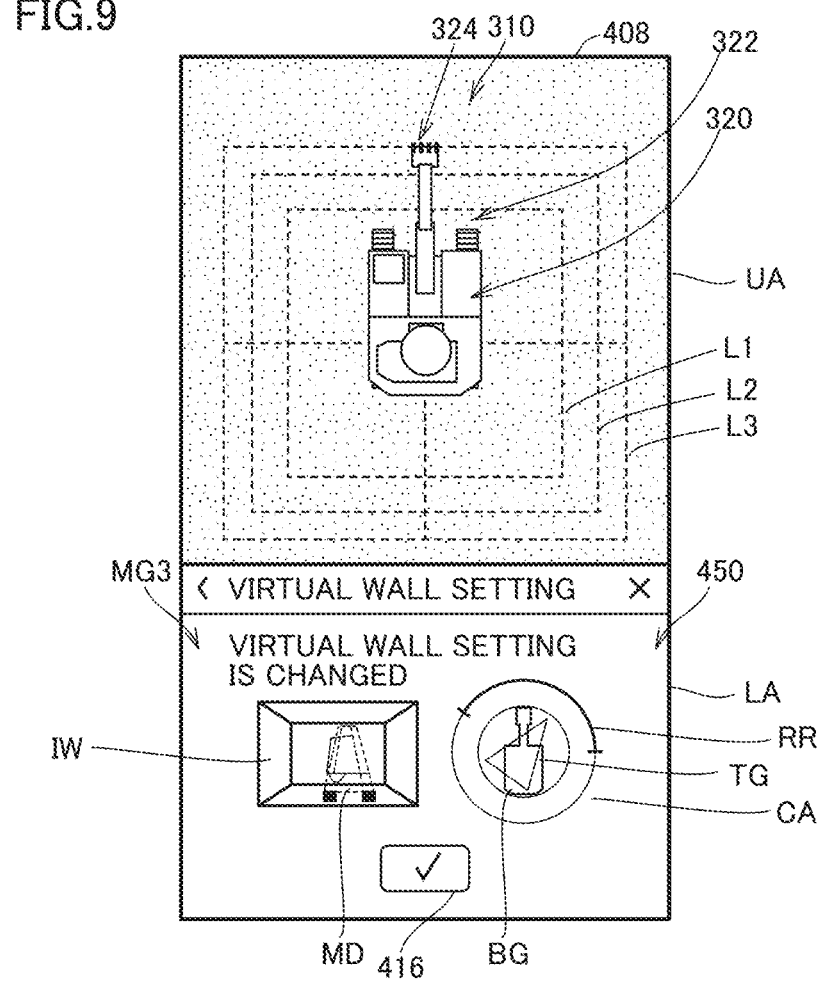
FIG. 9 is a diagram describing an example of a virtual wall setting confirmation screen 408 displayed on display apparatus 44 based on the embodiment.

FIG. 9 is a diagram describing an example of virtual wall setting confirmation screen 408 displayed on display apparatus 44 based on the embodiment. As shown in FIG. 9, virtual wall setting confirmation screen 408 is a screen displayed when, in the case of left-side virtual wall LW or a right-side virtual wall RW, a setting input of the second point for setting the virtual wall is received, and a screen change occurs.

Display apparatus 44 displays setting confirmation screen 408 that is divided into upper area UA and lower area LA. Setting confirmation screen 408 displays upper area UA and lower area LA at the same time.

Upper area UA of setting confirmation screen 408 displays an image of excavation machine 100 as viewed from the top (upper surface model image 320). The image of excavation machine 100 as viewed from the top is an image as viewed down from above excavation machine 100. Lower area LA of setting confirmation screen 408 displays a setting guidance image 450.

In upper area UA of setting confirmation screen 408, upper surface model image 320 of excavation machine 100 and surroundings image 310 around excavation machine 100 are synthesized and displayed in the synthesized state.

In lower area LA, setting guidance image 450 included in setting confirmation screen 408 displays a three-dimensional model MD of excavation machine 100 and also a virtual wall image IW that can be set around the three-dimensional model MD. A message MG3 for prompting confirmation of the set virtual wall "virtual wall setting is changed." is displayed. Setting confirmation screen 408 includes a confirmation button 416.

Virtual wall image IW may be displayed as follows. For example, with three-dimensional model MD of excavation machine 100 as a reference, the set virtual wall may be flashed or the set virtual wall may be displayed in color so as to emphasize the area of the set virtual wall.

Setting guidance image 450 on setting confirmation screen 408 may include and display a graphic image of a revolvable range image CA. Revolvable range image CA is information indicating the current direction of traveling apparatus 5 relative to revolving unit 3, the range of set revolution angle, and relation therebetween. As shown in FIG. 9, a circular arc RR shown by a thick line indicates a set revolvable angle range, a triangular arrow TG indicates the current direction of traveling apparatus 5 relative to revolving unit 3. As described above, the revolvable angle range is set by turning on one of or both of left revolution setting toggle switch 46F and right revolution setting toggle switch 46G.

In setting guidance image 450, a reference image BG, which is a graphic image representing a simplified upper surface of excavation machine 100, is displayed at the same time. Reference image BG represents a top view when excavation machine 100 faces forward on the front side. By looking at the difference between the direction of work implement 3 shown by reference image BG and the direction indicated by the tip of an arrow TG, a relative positional relation (revolution angle) between current revolving unit 3 and traveling apparatus 5 can be grasped.

When the operator selects confirmation button 416 and presses confirmation button 416, setting confirmation screen 408 changes to a next screen. When confirmation button 416 is pressed, screen 300 for normal mode is displayed on display apparatus 44. This means that when the operator presses confirmation button 416, the operator approves the virtual wall that has been set or changed.

As described in the foregoing, upper area UA of the setting screen (400, 402, and 404) displays an image of excavation machine 100 as viewed from the top (upper surface model image 320). Lower area LA of the setting screen displays the setting guidance image (410, 420, and 430) for setting the virtual wall. Therefore, during setting of the virtual wall, it is possible to set the virtual wall while confirming the setting guidance image and also confirming actual surroundings image (310) of excavation machine 100 at the view point from above. In other words, it becomes possible to set the virtual wall while confirming the relative positional relation between objects present around excavation machine 100 and excavation machine 100. If the operator tries to set the virtual wall while visually recognizing the surroundings of excavation machine 100, the range that is a blind spot from operator's cab 4 cannot be visually recognized. According to the embodiment of the present disclosure, since the surroundings image is displayed on the setting screen, it is possible to set the virtual wall while confirming the presence or absence of objects present in the range of a blind spot and confirming the distance to the objects. This makes it possible to set an appropriate operation range of excavation machine 100 by a simple method.

In upper area UA and lower area LA in setting screen (400, 402, and 404), the image (upper surface model image 320) of excavation machine 100 as viewed from the top and the setting guidance image (410, 420, and 430) for setting the virtual wall are each displayed. Although it is necessary to confirm the information displayed in upper area UA that is used as a reference for determining the position for setting the virtual wall, the setting guidance image for setting the virtual wall is provided in lower area LA, which makes it possible to visually recognize upper area UA without the visual field of the operator being blocked by the hands or fingers of the operator. Therefore, the operator can set the virtual wall while constantly checking the information shown by the surroundings image (310) displayed in upper area UA, so that an appropriate operation range of excavation machine 100 can be set by a simple method.

Figure 10:
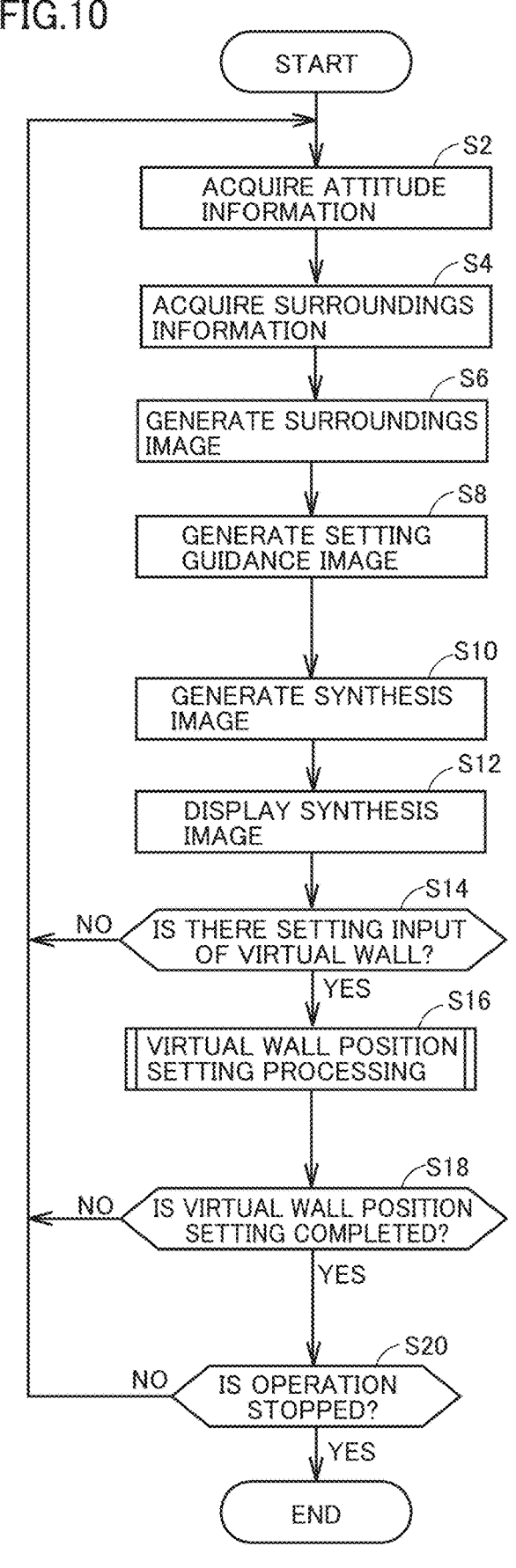
FIG. 10 is a flowchart describing display control process-ing of controller 26 based on the embodiment.

FIG. 10 is a flowchart describing display control processing of controller 26 based on the embodiment. As shown in FIG. 10, attitude information acquisition unit 102 acquires attitude information (step S2). Attitude information acquisition unit 102 acquires inclination angles $\theta 1$, $\theta 2$, and $\theta 3$ indicating the attitude of work implement 2 as the attitude information on excavation machine 100, an inclination angle $\theta 4$ representing the attitude of body 1 inclined in the left/right direction, an inclination angle $\theta 5$ of body 1 inclined in the fore/aft direction, and an angle of revolving unit 3.

Surroundings information acquisition unit 104 then acquires surroundings information (step S4). Surroundings information acquisition unit 104 acquires information on an actual image obtained by imaging the surroundings of excavation machine 100. Note that the order of acquiring the attitude information in step S2 and acquiring surroundings information in step S4 may be exchanged.

Next, surroundings image generation unit 114 generates a surroundings image (step S6). Surroundings image generation unit 114 generates the surroundings image based on the information on an actual image acquired by surroundings information acquisition unit 104.

Setting guidance image generation unit 116 generates a setting guidance image (step S8).

Synthesis unit 118 then generates a synthesis image by synthesizing the upper surface model image, the surrounding image, and the setting guidance image (step S10).

Next, display apparatus 44 displays the synthesis image generated by synthesis unit 118 (step S12). Specifically, display apparatus 44 displays setting screens 400 to 404 described in FIGS. 6 to 8 or setting confirmation screen 408 described in FIG. 9.

Next, setting input reception unit 106 determines whether or not there is a setting input of the virtual wall (step S14). Setting input reception unit 106 determines, for example, whether or not an operator's input of turning on right-side setting toggle switch 46A and left-side setting toggle switch 46B is received. The determination in step S14 may be the determination regarding whether or not the input of turning on either right-side setting toggle switch 46A or left-side setting toggle switch 46B is received. The determination in step S14 may include the determination regarding whether or not the input of turning on any one of front setting toggle switch 46C, upper-side setting toggle switch 46D, and lower-side setting toggle switch 46E is received.

When there is any one of the input of turning on front setting toggle switch 46C, the input of turning on upper-side setting toggle switch 46D, the input of turning on lower-side setting toggle switch 46E by the operator, step S16 is skipped, and the virtual wall position setting is assumed to be completed (YES in step S18), and the processing proceeds to step S20.

On the contrary, when the operator turns on any one of right-side setting toggle switch 46A and left-side setting toggle switch 46B, processing proceeds to step S16 (a flow shown in FIG. 11) for a virtual wall position setting processing.

In step S14, when setting input reception unit 106 determines that there is a setting input of the left-side virtual wall or the right-side virtual wall (YES in step S14), setting input reception unit 106 instructs setting guidance image generation unit 116 to execute the virtual wall position setting processing (step S16).

Details of the virtual wall position setting processing shown in FIG. 11 will be discussed later. When setting guidance image generation unit 116 determines that an input of, for example, turning on right-side setting toggle switch 46A by the operator is received, setting guidance image generation unit 116 generates a setting image of the right-side virtual wall and a setting guidance image including a message image for generating the right-side virtual wall. When setting guidance image generation unit 116 determines that an input of, for example, turning on left-side setting toggle switch 46B by the operator is received, setting guidance image generation unit 116 generates a setting image of the left-side virtual wall setting image and a setting guidance image including a message image for generating the left-side virtual wall. Both the setting guidance images are displayed on the setting screen together with the image including surroundings image 310 of excavation machine 100.

When setting button 412 is selected in the setting screen, setting guidance image generation unit 116 also determines that the setting input of the virtual wall is received, and generates the setting guidance image. When cancel button 414 or confirmation button 416 is selected, setting guidance image generation unit 116 generates one-preceding setting guidance image or ends the generation of the setting guidance image.

Next, controller 26 determines whether or not position setting of a prescribed virtual wall is completed by the operator operating work implement 2 or revolving unit 3 of excavation machine 100 (step S18). Note that acquiring the attitude information in step S2 may be executed for the first time before step S18. In step S18, when controller 26 determines that the position setting of the prescribed virtual wall is not complete (NO in step S18), controller 26 returns to step S2 and repeats the above processing.

In step S20, when controller 26 determines that the operation of excavation machine 100 is stopped (YES in step S20), controller 26 ends the processing. For example, when there is an engine stop instruction by the operator, controller 26 determines that the operation is stopped.

On the contrary, in step S20, when controller 26 determines that operation of excavation machine 100 is not ended (NO in step S20), controller 26 returns to step S2 and repeats the above processing. In excavation machine 100, the operation range of work implement 2 is regulated and controlled according to the set virtual wall.

On the contrary, in step S14, when setting input reception unit 106 determines that there is no setting input of the virtual wall (NO in step S14), controller 26 returns to step S2 and repeats the above processing. In doing so, display apparatus 44 displays screen 300 for normal mode described in FIG. 5.

Figure 11:
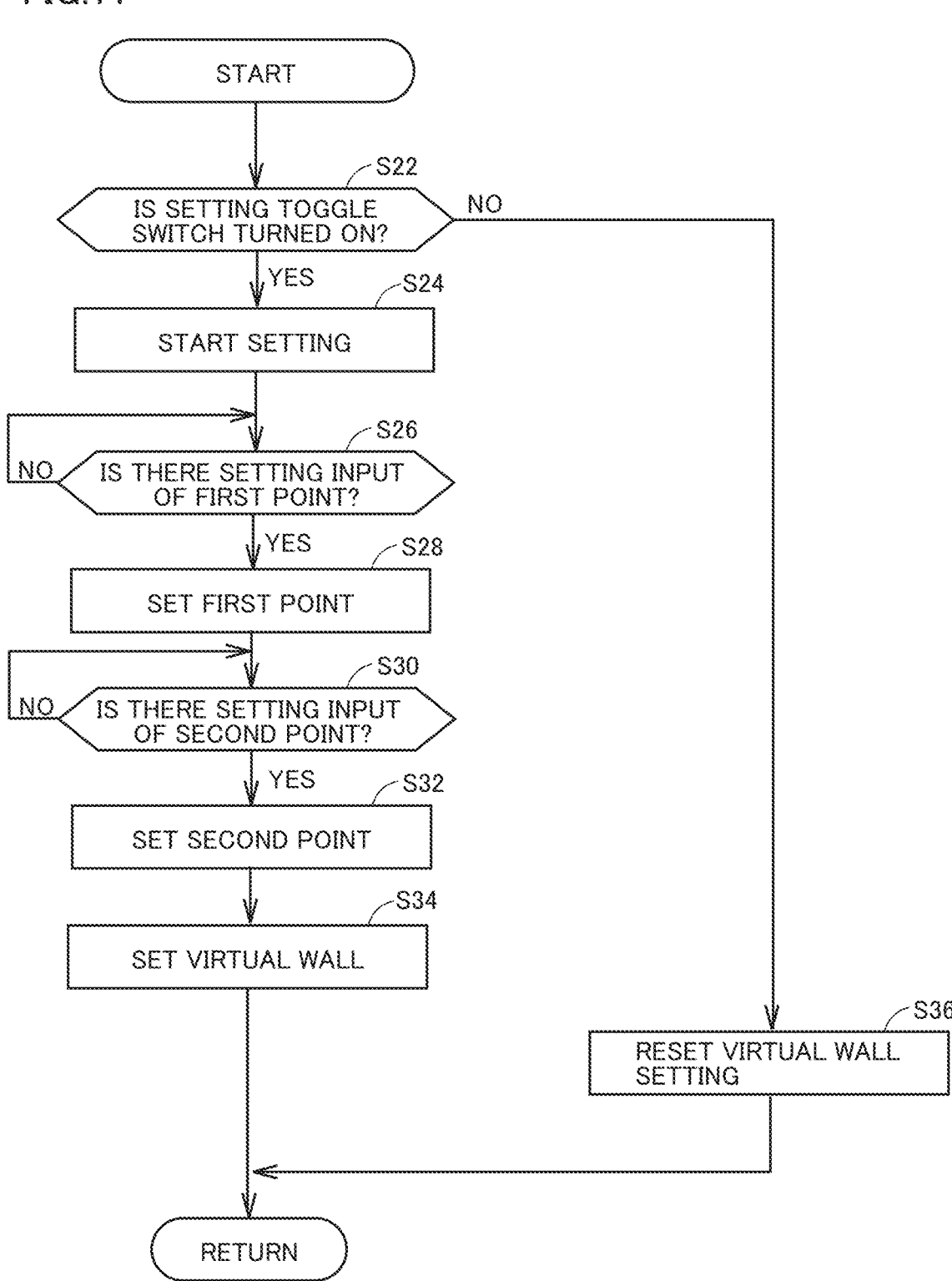
FIG. 11 is a flowchart describing the details of a virtual wall position setting processing of a virtual wall setting unit 107 based on the embodiment.

FIG. 11 is a flowchart describing the details of the virtual wall position setting processing of virtual wall setting unit 107 based on the embodiment. Specifically, FIG. 11 describes processing when there is a setting input of the virtual wall in step S14 (YES in step S14) shown in FIG. 10, the processing including executing the virtual wall position setting processing and completing the position setting of a desired virtual wall in step S18. In this case, step S22 corresponds to step S14 in FIG. 10, which determines whether there is a virtual wall setting input. FIG. 11 also shows the flowchart in the case of executing the setting of the virtual wall when the virtual wall is left-side virtual wall LW or right-side virtual wall RW. As shown in FIG. 11, setting input reception unit 106 determines whether or not any one of the setting toggle switches is on (step S22). Specifically, setting input reception unit 106 receives the operation of right-side setting toggle switch 46A and left-side setting toggle switch 46B in input apparatus 46 by the operator. Setting input reception unit 106 outputs, to virtual wall setting unit 107, on or off information according to the operation of right-side setting toggle switch 46A and left-side setting toggle switch 46B in input apparatus 46 by the operator.

When the setting toggle switches are on, virtual wall setting unit 107 starts the setting of the virtual wall (step S24). When the switch operation of right-side setting toggle switch 46A in the input apparatus 46 by the operator is on, virtual wall setting unit 107 starts the setting processing of the right-side virtual wall. When the switch operation of left-side setting toggle switch 46B in the input apparatus 46 by the operator is on, virtual wall setting unit 107 starts the setting processing of the left-side virtual wall.

Next, virtual wall setting unit 107 determines whether or not there is a setting input of a first point for the virtual wall (step S26). In the case of setting the left-side virtual wall, virtual wall setting unit 107 determines whether or not the operator has selected setting button 412 in the virtual wall setting screen 400. The operator operates work implement 2 or revolving unit 3 while observing setting guidance image 410 (see FIG. 6) to move work implement 2 to the position determined to be set as the first point for setting the left-side virtual wall, and then selects setting button 412. When setting button 412 is selected, it means that there is a setting input of the first point for the virtual wall (corresponding to point P1 in FIG. 6).

In step S26, when virtual wall setting unit 107 determines that there is a setting input of the first point for the virtual wall (YES in step S26), virtual wall setting unit 107 sets the first point for setting the virtual wall. Virtual wall setting unit 107 sets, as the coordinates of the first point, the distal end position of the bucket (for example, the distal end that is the position of teeth 8A of the bucket) of excavation machine 100 when setting button 412 is selected in virtual wall setting screen 400.

Next, virtual wall setting unit 107 determines whether or not there is a setting input of a second point (step S30). For example, in the case of setting the left-side virtual wall, virtual wall setting unit 107 determines whether or not the operator has selected setting button 412 in virtual wall setting screen 402. The operator operates work implement 2 or revolving unit 3 while observing setting guidance image 410 (see FIG. 7) to move work implement 2 to the position determined to be set as the second point for setting the left-side virtual wall, and then selects setting button 412. When setting button 412 is selected, it means that there is a setting input of the second point for the virtual wall (corresponding to point P2 in FIG. 7).

In step S30, when virtual wall setting unit 107 determines that there is a setting input of the second point (YES in step S30), virtual wall setting unit 107 sets the second point for setting the virtual wall (step S32). Virtual wall setting unit 107 sets, as the coordinates of the second point, the distal end position of the bucket (for example, the distal end that is the position of teeth 8A of the bucket) of excavation machine 100 when setting button 412 is selected in virtual wall setting screen 402.

Virtual wall setting unit 107 then sets, as a virtual wall, the plane that includes the first point and the second point and that is vertical to the ground (step S34). Virtual wall setting unit 107 can set, with the ground where excavation machine 100 is located as a reference, the plane that includes the first point and the second point and that is vertical to the ground as the vertical wall.

Virtual wall setting unit 107 then ends (returns) the processing. In other words, the processing proceeds to step S18 in FIG. 10.

On the contrary, in step S22, when setting input reception unit 106 determines that the setting toggle switches are not turned on (NO in step S22), setting input reception unit 106 outputs off information to virtual wall setting unit 107.

When the setting toggle switches are off, virtual wall setting unit 107 resets the setting of the virtual wall (step S36). When the operator performs switch operation of turning off right-side setting toggle switch 46A in the input apparatus 46 by the operator, virtual wall setting unit 107 resets the setting of the right-side virtual wall. When the operator performs switch operation of turning off left-side setting toggle switch 46B in the input apparatus 46 by the operator, virtual wall setting unit 107 resets the setting of the left-side virtual wall.

Virtual wall setting unit 107 then ends (returns) the processing. In other words, the processing proceeds to step S18 in FIG. 10.

With the processing, the operator can set the virtual wall while constantly checking the information shown by the surroundings image (310), so that an appropriate operation range of excavation machine 100 can be set with a simple method.

Modification 1

In a modification 1 of the embodiment, a method in which the position of the virtual wall can easily be grasped is described.

Specifically, synthesis unit 118 may further synthesize the image of the virtual wall based on the information on the position of the set virtual wall and may display the resultant image on display apparatus 44. In the screen for normal mode displayed on display apparatus 44, the image of the set virtual wall may be further synthesized with the image of excavation machine 100 as viewed from the top and be displayed. The image of the set virtual wall may be expressed by a line for example. This makes it easy for the operator to grasp the position where the virtual wall is set when excavation operation is performed.

The virtual walls may be colored by types to make it easy to understand whether each set virtual wall is a right-side virtual wall, a left-side virtual wall or a front virtual wall. This allows the operator to easily grasp which virtual wall is at which position when excavation operation is performed, for example.

Synthesis unit 118 may synthesize the image of the virtual wall with the image in lower area LA instead of the image in upper area UA, and display the resultant image.

Excavation machine 100 may further include selector switches, software buttons, or the like, for selecting whether or not to display the image of the virtual wall on display apparatus 44.

Modification 2

Figure 12:
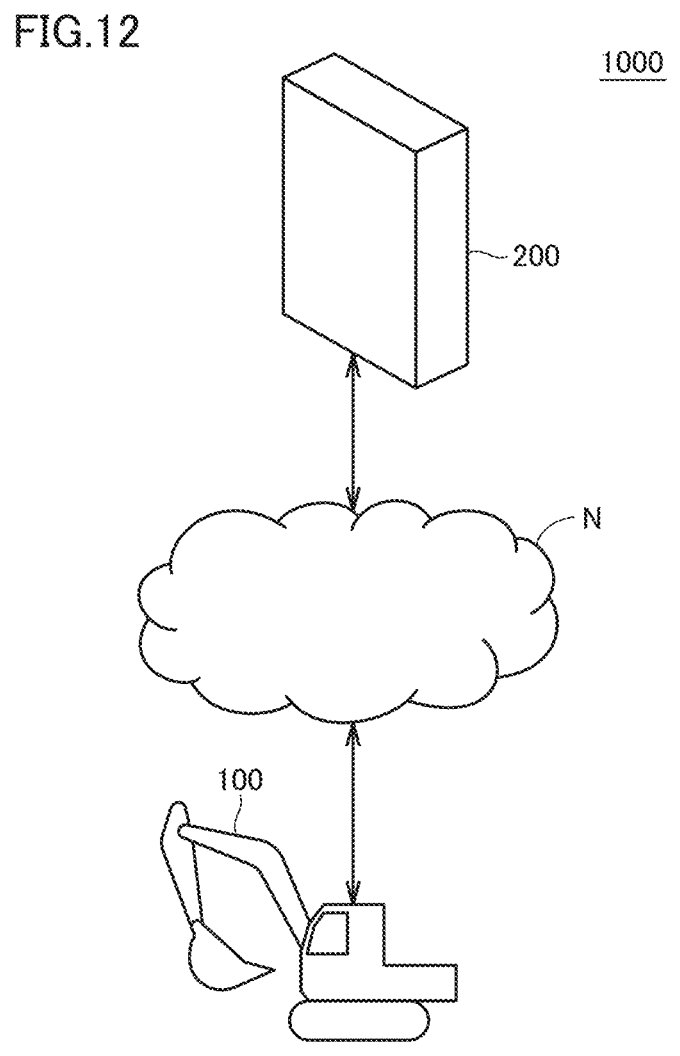

FIG. 12 is a diagram describing a system for setting an operation range of an excavation machine based on a modification 2 of the embodiment. As shown in FIG. 12, a system 1000 for operation range of an excavation machine based on the modification 2 of the embodiment includes a network N, a server 200, and an excavation machine 100.

System 1000 for setting an operation range includes excavation machine 100 that can communicate with server 200 via network N. In the above embodiment, the case of executing the processing of setting the operation range of the excavation machine in excavation machine 100 has been described. System 1000 for operation range of an excavation machine according to the modification 2 of the embodiment transmits the information acquired from various sensors or the like of excavation machine 100 to server 200 via network N, and executes processing of setting the operation range of the excavation machine in server 200. Specifically, server 200 may execute all or some of the functions of controller 26 described in FIG. 4. Excavation machine 100 can reduce a processing load of controller 26 of excavation machine 100 by performing the processing in collaboration with server 200.

Modification 3

Figure 13:
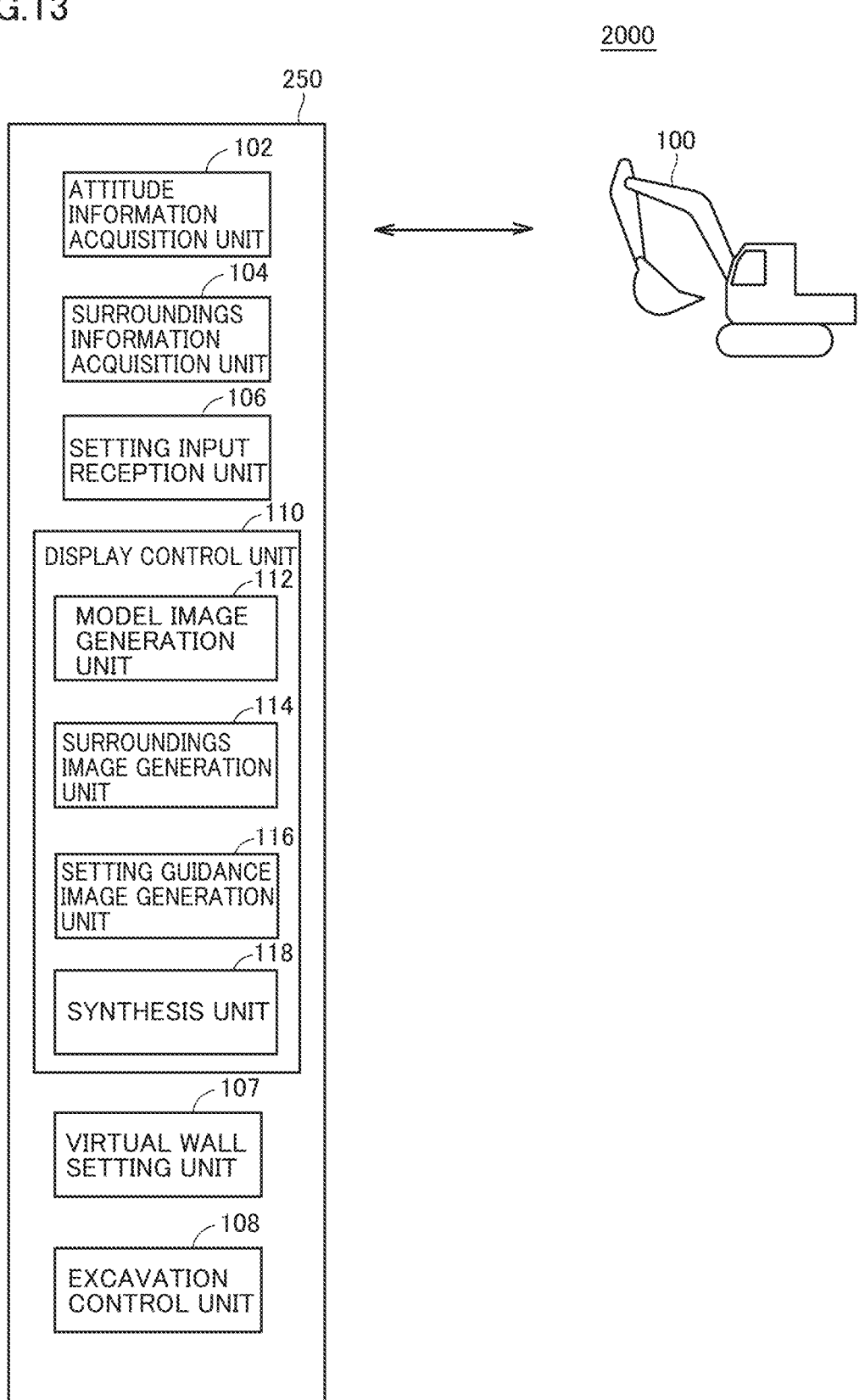
FIG. 13 is a diagram describing a system for setting an operation range of an excavation machine based on a modification 3 of the embodiment.

FIG. 13 is a diagram describing a system for setting an operation range of an excavation machine based on a modification 3 of the embodiment. As shown in FIG. 13, a system 2000 for operation range of an excavation machine based on the modification 3 of the embodiment includes excavation machine 100, and a mobile terminal 250 that can communicate with excavation machine 100. As in the case of the modification 2 of the embodiment, system 2000 for setting an operation range transmits the information acquired from various sensors or the like of excavation machine 100 to mobile terminal 250, and executes the processing of setting the operation range of the excavation machine in mobile terminal 250. Specifically, it is also possible to mount the functions of controller 26 described in FIG. 4 on mobile terminal 250 that can remotely control excavation machine 100. This configuration makes it possible to easily set the operation range of excavation machine 100 by using a display apparatus and a touch panel installed on mobile terminal 250. Server 200 may be further combined into the system for an operation range of an excavation machine. An application program may be provided to execute the functions of controller 26 of the present disclosure.

In the above embodiment, although the hydraulic excavator is described as an excavation machine, the embodiment disclosed herein is not limited to the hydraulic excavator and is applicable to excavators of other types, such as mechanical rope excavators, electric excavators, and wheel loaders. The hydraulic excavator is not limited to the hydraulic excavator having a crawler belt, and may be a tire-type hydraulic excavator.

While the embodiment of the present disclosure has been described in the foregoing, it should be understood that the embodiment disclosed herein is in all respects illustrative and is not considered as the basis for restrictive interpretation. The scope of the present disclosure is defined by the range of appended claims, and all changes which come within the range of the claims and meaning and the range of equivalency thereof are therefore intended to be embraced therein.

REFERENCE SIGNS LIST

1 Body; 2 Work implement; 3 Revolving unit; 4 Operator's cab; 4S Operator's seat; 5 Traveling apparatus; 5Cr Crawler belt; 6 Boom; 7 Dipper stick; 8 Bucket; 8A Teeth; 9 Engine compartment; 10 Boom cylinder; 11 Dipper stick cylinder; 12 Bucket cylinder; 13 Boom pin; 14 Dipper stick pin; 15 Bucket pin; 16 Boom cylinder stroke sensor; 17 Dipper stick cylinder stroke sensor; 18 Bucket cylinder stroke sensor; 19 Handrail; 20 Position detector; 21 Antenna; 23 Global coordinate computing unit; 26 Controller; 32 Body attitude detection sensor; 34 Revolution angle sensor; 36 Work implement attitude detection sensor; 38 Surroundings monitoring sensor; 40 Storage apparatus; 42 Control lever; 44 Display apparatus; 46 Input apparatus; 46A Right-side setting toggle switch; 46B Left-side setting toggle switch; 46C Front setting toggle switch; 48 Solenoid control valve for slewing motor; 50 Solenoid control valve for work implement; 52 Solenoid control valve for travel motor; 54 Engine; 56 Travel motor; 58 Hydraulic pump; 60 Hydraulic oil tank; 62 Slewing motor; 100 Excavation machine; 102 Attitude information acquisition unit; 104 Surroundings information acquisition unit; 106 Setting input reception unit; 107 Virtual wall setting input; 108 Excavation control unit; 110 Display control unit; 112 Model Image generation unit; 114 Surroundings image generation unit; 116 Setting guidance image generation unit; 118 Synthesis unit; 200 Server; 250 Mobile terminal

The invention claimed is:

1. A system for setting an operation range of an excavation machine, comprising:
   a surroundings information acquisition unit that acquires information on an actual image of surroundings of the excavation machine;
   a user interface unit; and
   a controller that generates a surroundings image based on the information on the actual image acquired by the surroundings information acquisition unit and that displays, on the user interface unit, the surroundings image and a setting guidance image for setting a virtual wall that regulates the operation range of the excavation machine, wherein
   the controller receives a setting of a first position of a distal end of the excavation machine as a first point, receives a setting of a second position of the distal end of the excavation machine as a second point, and sets, as the virtual wall, a plane that includes the first point and the second point received as the setting and that is vertical to a ground.

2. The system for setting an operation range of an excavation machine according to claim 1, wherein
   the surroundings image is displayed in an upper area of the user interface unit, and
   the setting guidance image is displayed in a lower area of the display unit.

3. The system for setting an operation range of an excavation machine according to claim 1, further comprising a storage unit that stores an upper surface model image of the excavation machine as viewed from a top, wherein
   the user interface unit displays the upper surface model image along with the surroundings image.

4. The system for setting an operation range of an excavation machine according to claim 3, wherein
   the surroundings image is a bird's-eye view image with the upper surface model image as a center.

5. The system for setting an operation range of an excavation machine according to claim 3, wherein
   in the user interface unit, a guide line is superimposed and displayed so as to surround the upper surface model image.

6. The system for setting an operation range of an excavation machine according to claim 1, wherein
   the excavation machine includes a work implement having a bucket, and
   the distal end constitutes teeth of the bucket.

7. The system for setting an operation range of an excavation machine according to claim 1, wherein
   the setting guidance image includes an image showing a positional relation between an attitude of the excavation machine and the virtual wall and a message, in order to promote setting of the virtual wall.

8. The system for setting an operation range of an excavation machine according to claim 1, wherein
   the virtual wall is set on either a left side or a right side of the excavation machine.

9. A method for controlling a system for setting an operation range of an excavation machine, comprising:
   acquiring information on an actual image of surroundings of the excavation machine;
   generating a surroundings image based on the acquired information on the actual image;
   displaying, on a user interface unit, the surroundings image and a setting guidance image for setting a virtual wall that regulates the operation range of the excavation machine;
   receiving a setting of a first position of a distal end of the excavation machine as a first point;
   receiving a setting of a second position of the distal end of the excavation machine as a second point; and
   setting, as the virtual wall, a plane that includes the first point and the second point received as the setting and that is vertical to a ground.

* * * * *